(12) United States Patent
Suzuki

(10) Patent No.: US 8,545,025 B2
(45) Date of Patent: Oct. 1, 2013

(54) IMAGE PROCESSING APPARATUS, PROJECTOR, IMAGE PROCESSING METHOD, AND PROGRAM

(75) Inventor: Naoki Suzuki, Matsumoto (JP)

(73) Assignee: Seiko Epson Corporation, Tokyo (JP)

(\*) Notice: Subject to any disclaimer, the term of this patent is extended or adjusted under 35 U.S.C. 154(b) by 304 days.

(21) Appl. No.: 12/893,136

(22) Filed: Sep. 29, 2010

(65) Prior Publication Data

US 2011/0080523 A1   Apr. 7, 2011

(30) Foreign Application Priority Data

Oct. 1, 2009   (JP) .................................. 2009-229302

(51) Int. Cl.
- *G03B 21/14* (2006.01)
- *H04N 3/23* (2006.01)
- *H04N 3/22* (2006.01)
- *G06K 9/40* (2006.01)

(52) U.S. Cl.
USPC ............... 353/69; 353/70; 348/177; 348/746; 348/747; 348/333.1; 348/806

(58) Field of Classification Search
USPC ............ 353/69, 70; 348/177–178, 745–747, 348/333.1, 806; 382/275
See application file for complete search history.

(56) References Cited

U.S. PATENT DOCUMENTS

| | | | |
|---|---|---|---|
| 7,003,172 B2 | 2/2006 | Takeuchi et al. | |
| 2003/0068094 A1* | 4/2003 | Kimura et al. | 382/274 |
| 2003/0210253 A1* | 11/2003 | Kang et al. | 345/642 |
| 2006/0285080 A1 | 12/2006 | Kurihara | |

FOREIGN PATENT DOCUMENTS

| | | | |
|---|---|---|---|
| JP | 4-338706 A | 11/1992 | |
| JP | 10-171045 A | 6/1998 | |
| JP | 11-306365 A | 11/1999 | |
| JP | 2003-032580 A | 1/2003 | |
| JP | 2006-352514 A | 12/2006 | |
| JP | 2009-003001 A | 1/2009 | |

\* cited by examiner

*Primary Examiner* — Tony Ko
*Assistant Examiner* — Magda Cruz
(74) *Attorney, Agent, or Firm* — ALG Intellectual Property, LLC

(57) ABSTRACT

An image processing apparatus includes: an image information input unit which receives input of first image information; and a sharpness adjustment unit which divides a screen image corresponding to the first image information into a plurality of areas and performs a sharpness adjustment for each of the divided areas to output second image information.

10 Claims, 6 Drawing Sheets

| DIVIDED AREA | DIVIDED AREA | DIVIDED AREA |
|---|---|---|
| DIVIDED AREA | DIVIDED AREA | DIVIDED AREA |
| DIVIDED AREA | DIVIDED AREA | DIVIDED AREA |

FIG. 2

| -K | -K | -K |
|----|------|----|
| -K | 1+8K | -K |
| -K | -K | -K |

FIG. 5

IMAGE PROCESSING APPARATUS, PROJECTOR, IMAGE PROCESSING METHOD, AND PROGRAM

CROSS-REFERENCE

The entire disclosure of Japanese Patent Application No. 2009-229302 filed Oct. 1, 2009 is expressly incorporated by reference herein.

BACKGROUND

1. Technical Field

The present invention relates to an image processing apparatus, a projector, an image processing method, and a program, and more particularly to an image processing apparatus which can increase sharpness at an edge portion of an image projected by a projector, an image processing method, a projector, and a program.

2. Related Art

In general, projectors have been used in which light incident from a light source based on image information is modulated by light modulating means such as a liquid crystal panel, and the modulated light is focused on a screen using a projection optical system to thereby display an image. In such projectors, the distance from the projection optical system to the screen is different at the center of the projected image from that it is at an outer edge portion of the projected image. Therefore, when the center of the projected image is focused, the edge portion is not focused, leading to a problem that the image has poor sharpness.

Therefore, a technique has been disclosed in which, for example, the distance between the projector and the screen is measured using an ultrasonic range finder, and a projector lens is automatically focused to thereby perform a focus adjustment (refer to JP-A-4-338706, for example). As another related art, a technique has been disclosed in which, for example, by appropriately increasing or decreasing the inclination angle of an optical modulation device and using a focus-checking pattern projected on the entire screen, the adjustment can be made so that even the upper and lower edges of the screen are focused (refer to JP-A-2006-352514, for example).

In the technique described in JP-A-4-338706, however, although the vicinity of the optical axis of the screen is focused, the edge portion of the projected area is still not focused, leading to a problem that the image has poor sharpness. In the technique described in JP-A-2006-352514, although the entire area of the screen can be focused to certain extent, the structure is extremely complicated, leading to problems that the manufacturing is difficult, and the manufacturing cost is high.

SUMMARY

An advantage of some aspects of the invention is to provide an image processing apparatus which can increase sharpness over the entire area of an image projected by a projector and decrease the manufacturing cost, an image processing method, a projector, and a program.

A first aspect of the invention is directed to an image processing apparatus including: an image information input unit which receives input of first image information; and a sharpness adjustment unit which divides a screen image corresponding to the first image information into a plurality of areas and performs a sharpness adjustment for each of the divided areas to output second image information.

According to the first aspect of the invention, the screen image based on the image information is divided into a plurality of areas, and the sharpness adjustment is performed for each of the divided areas. Therefore, sharpness at an edge portion of an image can be increased without deteriorating the image quality of the central area of the screen image.

In the image processing apparatus, the sharpness adjustment unit may perform the sharpness adjustment using adjustment values which are previously determined for each of the divided areas. According to this, an optimum sharpness adjustment can be applied to each of the divided areas using its own adjustment values.

In the image processing apparatus, the sharpness adjustment unit may perform the sharpness adjustment using one adjustment value which is previously determined for each of the areas. According to this, since one adjustment value of the sharpness adjustment suffices for each of the divided areas, a circuit configuration for increasing the sharpness at the edge portion of the image can be simplified.

In the image processing apparatus, a trapezoidal correction unit which makes a trapezoidal correction on the image information on which the sharpness adjustment has been made with the sharpness adjustment unit may be provided. When the sharpness adjustment is performed after performing the trapezoidal correction, there is a risk in that the image quality may be remarkably deteriorated to make the determination of the image difficult. In this application example where the trapezoidal correction is made after making the sharpness adjustment, such a problem does not occur.

In the image processing apparatus, an enlarging/reducing adjustment unit which outputs a result of applying an enlarging or reducing process to the first image information is provided, and the sharpness adjustment unit may apply the sharpness adjustment to the output of the enlarging/reducing adjustment unit. The sharpness adjustment is performed after performing the enlarging or reducing process of the image information, whereby omission of high-frequency components included in the image information can be reduced.

In the image processing apparatus, the enlarging/reducing adjustment unit and the sharpness adjustment unit are configured integrally with each other to simultaneously perform the enlarging or reducing process and a sharpness process of the image information, whereby the circuit configuration of the image processing apparatus can be simplified, and sharpness at the edge portion of the image can be increased.

A second aspect of the invention is directed to a projector including: the image processing apparatus; a light source; a light modulator which modulates illumination light incident from the light source based on output of the image processing apparatus; and a projection optical system which projects the light modulated by the light modulator.

According to the second aspect of the invention, it is possible to provide a projector which can project an image with less blur over the entire projected area on the screen. In addition, the mechanism for increasing or decreasing the inclination angle of the optical modulation device in the past is no more required, which enables a simplified structure, an easy manufacture, and a reduction in manufacturing cost.

A third aspect of the invention is directed to an image processing method including: performing an image information input process which receives input of first image information; dividing a screen image based on the first image information into a plurality of areas; and performing a sharpness adjustment process which performs a sharpness adjustment for each of the divided areas to output second image information.

A fourth aspect of the invention is directed to an information storage medium in which a program controlling a computer to generate image data to be supplied to a projector is recorded, the program causing the computer to realize: a function of receiving input of first image information; a function of dividing a screen image based on the first image information into a plurality of areas; a function of setting an adjustment value of a sharpness adjustment for each of the divided areas; and a function of outputting second image information obtained by performing the sharpness adjustment for each of the divided areas based on the adjustment value.

Even in the third and fourth aspects of the invention in which the invention is embodied as the image processing method and as the information storage medium, the same advantages as those described above can be provided.

BRIEF DESCRIPTION OF THE DRAWINGS

The invention will be described with reference to the accompanying drawings, wherein like numbers reference like elements.

FIG. 2 is an explanatory diagram showing an example of dividing an image in image processing according to the invention.

FIG. 5 is an explanatory diagram showing an example of edge enhancement in the image processing according to the invention.

DESCRIPTION OF EXEMPLARY EMBODIMENTS

Hereinafter, an embodiment of the invention will be described with reference to the drawings.

Figure 1:
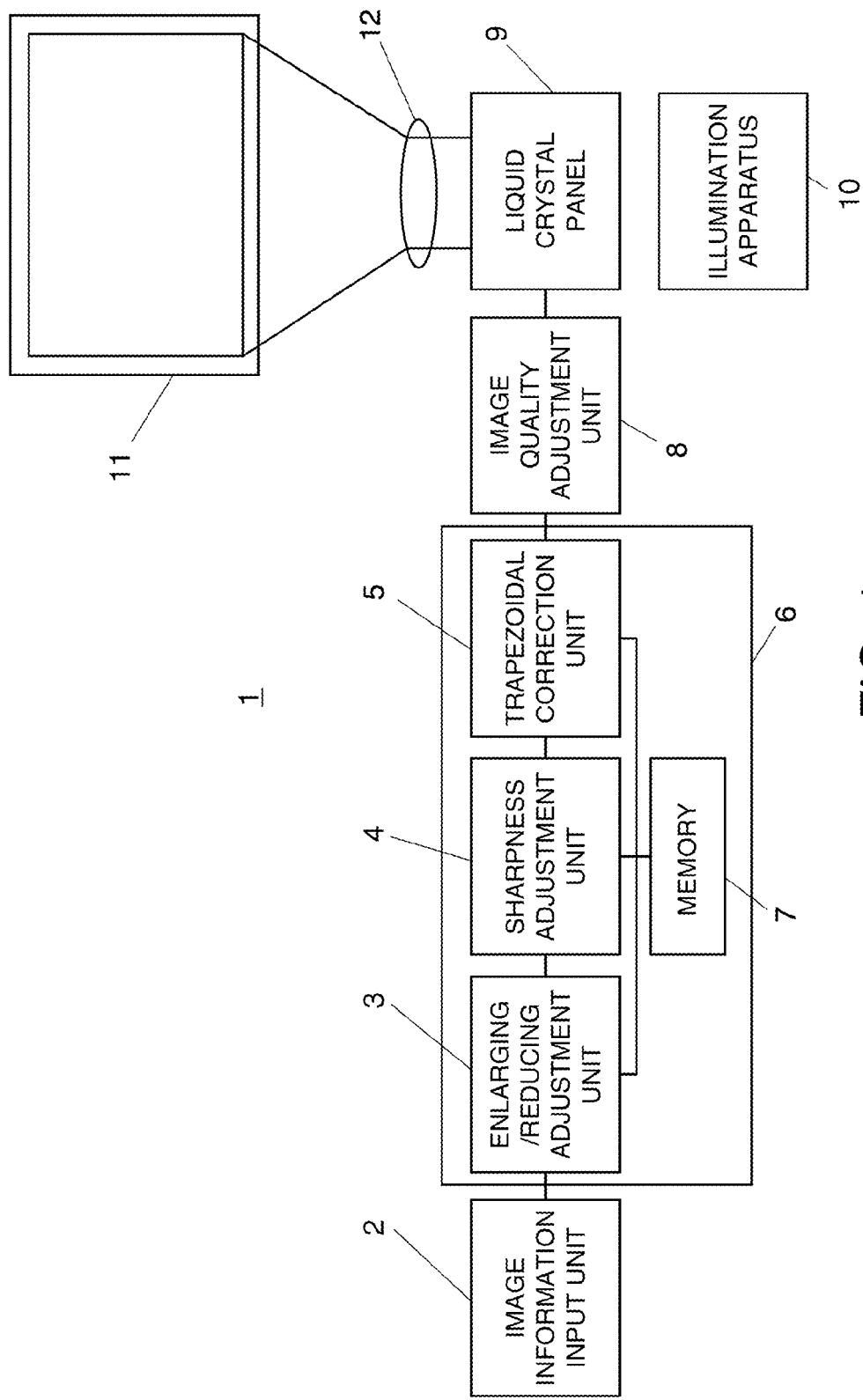
FIG. 1 is a block diagram showing an embodiment of a projector to which an image processing apparatus according to the invention is applied.

FIG. 1 is a schematic block diagram showing the embodiment of a projector to which an image processing apparatus according to the invention is applied. In the embodiment, a projector 1 includes an image information input unit 2. To the image information input unit 2, original image information in the form of digital signal, or original image information which was in the form of analog signal but converted into digital signal by a not-shown A/D converter is input. The original image information corresponds to the "first image information" according to the invention.

The projector 1 includes an image processing circuit which performs various kinds of image processing on the original image information input from the image information input unit 2 to thereby generate image information corresponding to an image to be projected by the projector 1. The image processing circuit can include various embodiments. In the embodiment, however, an image processing integrated circuit 6 having an enlarging/reducing adjustment unit 3, a sharpness adjustment unit 4, and a trapezoidal correction unit 5 all integrated into one chip is employed.

The enlarging/reducing adjustment unit 3 is configured to execute an enlarging or reducing process of the original image according to the user's settings.

The sharpness adjustment unit 4 is configured to divide a screen image based on the original image information into a plurality of areas and output a result of performing a sharpness adjustment for each of the divided areas. In the embodiment as shown in FIG. 2, the screen image is divided into nine areas in a lattice shape, and the sharpness adjustment is performed for each of the divided areas. In this case, the distance from a projection optical system to a screen is different at the center of a projected image from that at an edge portion of the projected image. Therefore, when the center of the projected image is focused, the outer edge portion is not focused, whereby the image results in poor sharpness. In the embodiment, therefore, the sharpness adjustment is performed so that the sharpness is higher at the edge portion of the image than at the central portion thereof. As the sharpness adjustment, a sharpness adjustment using linear interpolation is performed, for example. The result of the sharpness adjustment corresponds to the "second image information" according to the invention.

Figure 3:
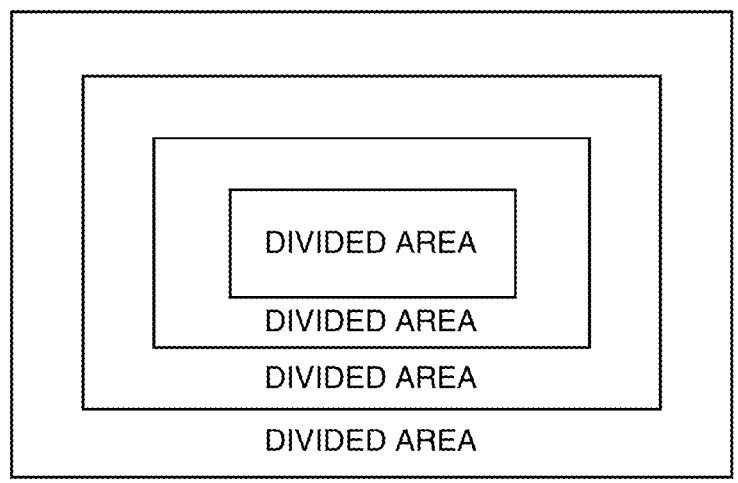
FIG. 3 is an explanatory diagram showing another example of dividing an image in the image processing according to the invention.

The number of divided areas of the screen image is not limited to nine. The screen image may be divided into any number of areas as long as it includes a plurality of divided areas. In addition to the example shown in FIG. 2, the screen image may be divided into a plurality of areas in a concentric manner as shown in FIG. 3, for example. The way of dividing the area can be set arbitrarily.

Figure 4:
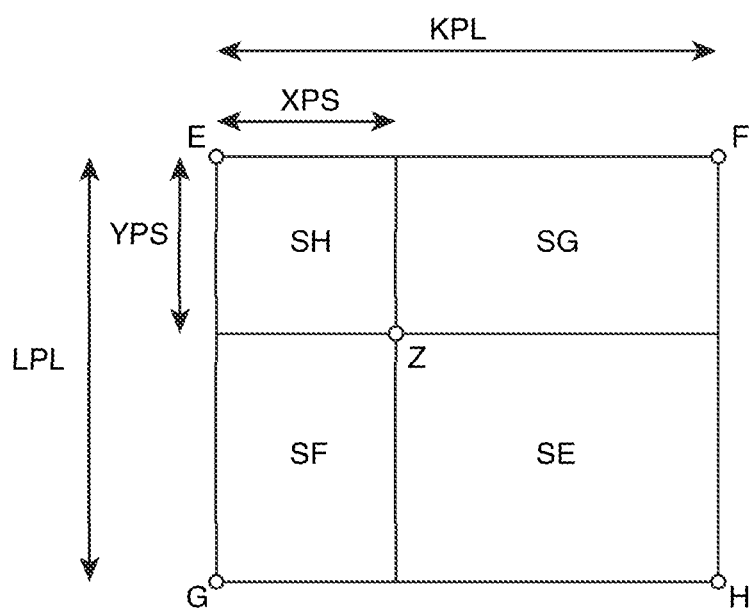
FIG. 4 is an explanatory diagram showing an example of linear interpolation in the image processing according to the invention.

Linear interpolation is performed as follows, for example. As shown in FIG. 4, in the case where a length in a horizontal direction in one divided area is KPL, a length in a vertical direction is LPL, and respective values at four corners are E, F, G, and H, when positional coordinates of a point Z to be corrected are defined XPS and YPS, the area ratio among SE, SF, SG, and SH is obtained by the following equations.

$$SE=(KPL-XPS)\times(LPL-YPS)/(KPL\times LPL)$$

$$SF=XPS\times(LPL-YPS)/(KPL\times LPL)$$

$$SG=(KPL-XPS)\times YPS/(KPL\times LPL)$$

$$SH=XPS-YPS/(KPL\times LPL)$$

Here, normalization is performed so that the following equation is satisfied.

$$SE+SF+SG+SH=1024$$

Thereafter, interpolation operation is carried out by the following equation.

$$Z=(E\times SE+F\times SF+G\times SG+H\times SH)/1024$$

Figure 5:
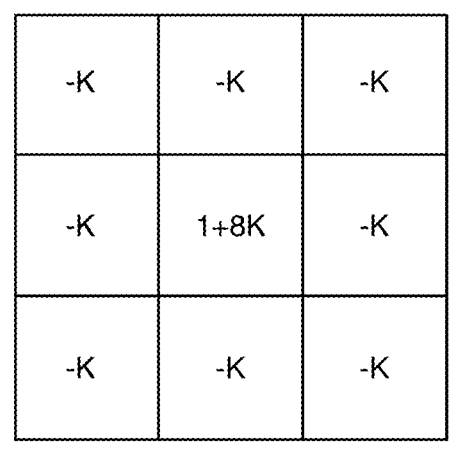

Thereafter, the sharpness adjustment is performed based on Laplacian filter using coefficients shown in FIG. 5. Although the coefficients of 3×3 are used in the embodiment, other coefficients such as of 5×5 may be used.

In the embodiment, the adjustment value due to the sharpness adjustment is previously determined for each divided area and stored in a memory 7. In the embodiment, the sharpness adjustment is performed using one adjustment value which is previously determined for each area. However, a plurality of adjustment values may be set to one area.

In the embodiment, the enlarging/reducing adjustment unit 3 and the sharpness adjustment unit 4 are separately provided. However, the enlarging/reducing adjustment unit 3 and the sharpness adjustment unit 4 may be provided integrally with each other, and the sharpness adjustment may be performed for each area simultaneously when the enlarging or reducing process is performed. Here, a sharpness adjustment using bicubic interpolation will be described.

Bicubic interpolation is performed using the following equations:

$$W(x)=1 \text{ (when } x=0)$$

$$W(x)=(a+2)|x|^3-(a-3)|x|^2+1 \text{ (when } 0 \le |x| < 1)$$

$$W(x)=a|x|^3-5a|x|^2 8a|x|-4a \text{ (when } 1 \le |x| < 2)$$

$$W(x)=0 \text{ (when } 2 \le |x|)$$

where x is a distance from a pixel of interest.

When the value of a is decreased, the sharpness of image can be increased. In the embodiment, the value of a is previously set for each divided area and stored in the memory 7.

The trapezoidal correction unit 5 is configured to correct, through image processing, trapezoidal distortion caused when oblique projection is performed by the projector 1. The process in the trapezoidal correction unit 5 is well known, and therefore, the detailed description thereof is omitted.

The projector 1 also includes an image quality adjustment unit 8 which performs an image quality adjustment, such as a color adjustment, of the image processed by the trapezoidal correction unit 5. The image information input unit 2, the enlarging/reducing adjustment unit 3, the sharpness adjustment unit 4, the trapezoidal correction unit 5, and the image quality adjustment unit 8 correspond to the "image processing apparatus" according to the invention.

The projector 1 further includes a liquid crystal panel 9 which forms a predetermined image based on image information output from the image quality adjustment unit 8, an illumination apparatus 10 for illuminating the liquid crystal panel 9, and a projection optical system 12 which projects transmitted light having passed through the liquid crystal panel 9 on a screen 11.

The liquid crystal panel 9 is a transmissive liquid crystal panel which is driven based on the image information output from the image quality adjustment unit and therefore used as a light modulator modulating illumination light incident from the illumination apparatus 10 on the liquid crystal panel 9. As the illumination apparatus 10, a high-pressure mercury lamp or metal halide lamp is used. The illumination apparatus 10 and the projection optical system correspond to the "projection optical system" according to the invention.

Although not shown in the drawing, the projector 1 has three liquid crystal panels 9 of three colors of RGB. The image processing apparatus has a function of processing image information of three colors. The illumination apparatus 10 has a color light separation optical system which separates white light into three color lights. The projection optical system has a combining optical system which combines three color image lights to generate image light representing a color image. The configuration of such an optical system of the projector 1 is described in detail in, for example, JP-A-10-171045 disclosed by the present applicant, and therefore the description thereof is omitted herein.

Figure 6:
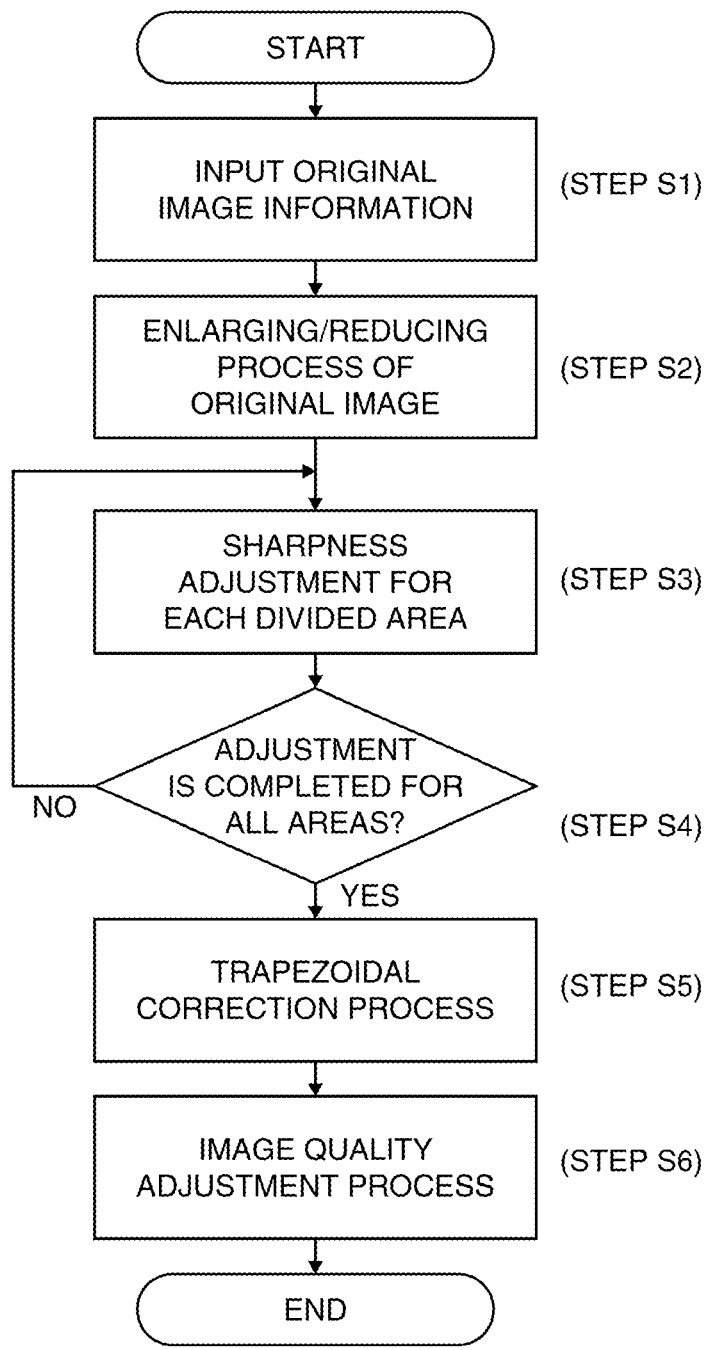
FIG. 6 is a flowchart showing operation of the image processing according to the invention.

Next, an image processing method according to the invention and using the image processing apparatus, and operation of the projector 1 will be described with reference to a flowchart shown in FIG. 6.

First, when original image information is input to the image information input unit 2 (Step S1), the original image information is output from the image information input unit 2 to the enlarging/reducing adjustment unit 3. Next, the enlarging or reducing process is performed on the original image data with the enlarging/reducing adjustment unit 3 (Step S2).

The image information on which the enlarging or reducing process has been performed is output to the sharpness adjustment unit 4, and the sharpness adjustment unit 4 divides the image information into a plurality of areas. Then, the sharpness adjustment value is read out of the memory 7 for each divided area to perform the sharpness adjustment process for each divided area (Step S3). Thereafter, when the sharpness adjustment process is completed for all the areas, the image information after performing the sharpness adjustment is output to the trapezoidal correction unit 5 (Step S4: YES). When the sharpness adjustment process is not completed, the adjustment process is continued until it is completed (Step S4: NO).

On the image information after performing the sharpness adjustment, the trapezoidal correction unit 5 performs a trapezoidal correction process according to an oblique angle upon projection (Step S5). The image information on which the trapezoidal correction process has been performed is output to the image quality adjustment unit 8, and the image quality adjustment unit performs an image quality adjustment such as a color adjustment (Step S6).

The liquid crystal panel 9 is driven based on the image information on which the image processing has been performed in this manner, to thereby modulate illumination light incident from the illumination apparatus 10 on the liquid crystal panel 9, whereby an image is projected on the screen 11 via the projection optical system 12.

In the embodiment as described above, the enlarged or reduced image information is divided into a plurality of areas, and the sharpness adjustment is performed based on the adjustment value which is previously determined for each area. Therefore, the sharpness of an image at the edge portion can be increased with a simple process, and the entire area of the projected image projected on the screen 11 can be focused. In addition, the mechanism for increasing or decreasing the inclination angle of the optical modulation device in the past is no more required, which enables a simplified structure, an easy manufacture, and a reduction in manufacturing cost.

In the embodiment, the trapezoidal correction is performed after performing the sharpness adjustment. When the sharpness adjustment is performed after performing the trapezoidal correction, there is a risk in that it may be difficult to properly determine pixels. According to the embodiment, however, such a risk can be prevented, and the trapezoidal correction can be performed on proper pixels.

Moreover, since the process of receiving input of the original image information and the sharpness adjustment process of performing the sharpness adjustment for each divided area with the sharpness adjustment unit 4 are processed by a computer in the image processing operation, the invention can be embodied as a program for realizing the processes.

In the embodiment, the projector 1 using the transmissive liquid crystal panel 9 has been described. However, the invention is also applicable to a projector 1 using a reflective liquid crystal panel 9. The term "transmissive" used herein means that the liquid crystal panel 9 is of the type which transmits light therethrough, while the term "reflective" means that the liquid crystal panel 9 is of the type which reflects light.

The projector 1 includes a front projection-type projector 1 which projects an image from an observing direction of a projection surface and a rear projection-type projector 1 which projects an image on the opposite side from the observing direction of the projection surface. The configuration of the projector 1 shown in FIG. 1 is applicable to both of them.

In the embodiment, the white light from the illumination apparatus 10 is modulated into respective colors using the color light separation optical system. As the illumination apparatus 10, an LED may be used, for example. In stead of the liquid crystal panel 9, a color wheel which is illuminated by the illumination apparatus 10 and a device (light modulating unit) which is composed of micro-mirror pixels and irradiated with the transmitted light of the color wheel may be combined together to modulate and combine color lights.

In the embodiment, the invention has been described with reference to an example in which the image processing apparatus is configured to be incorporated in the projector. However, the invention is not limited thereto. That is, the image processing apparatus according to the invention can be configured to be incorporated in an image output apparatus which supplies image data to the projector. In this case, since an image processing circuit which performs complicated image processing does not need to be mounted on the projector, the main body of the projector can be provided at low cost. Moreover, by providing the function of the image processing apparatus according to the invention to an image output apparatus such as a personal computer, it is possible to construct an image projection system whose performance can be easily improved.

The invention is not limited to the embodiment but can be modified variously based on the gist of the invention.

What is claimed is:

1. An image processing apparatus comprising:
    an image information input unit which receives input of a first image information; and
    a sharpness adjustment unit which divides a screen image corresponding to the first image information into a plurality of areas and performs a sharpness adjustment for each of the divided areas to output a second image information,
    wherein the sharpness adjustment unit performs the sharpness adjustment using an adjustment value which is previously determined for each of the divided areas.

2. The image processing apparatus according to claim 1, further comprising a trapezoidal correction unit which applies a trapezoidal correction process to the second image information.

3. The image processing apparatus according to claim 1, further comprising an enlarging/reducing adjustment unit which outputs a result of applying an enlarging or reducing process to the first image information, wherein the sharpness adjustment unit applies the sharpness adjustment to the output of the enlarging/reducing adjustment unit.

4. The image processing apparatus according to claim 3, wherein the enlarging/reducing adjustment unit and the sharpness adjustment unit are configured integrally with each other to simultaneously perform the enlarging or reducing process and a sharpness process of the image information.

5. A projector comprising:
    the image processing apparatus according to claim 1;
    a light source;
    a light modulator which modulates illumination light incident from the light source based on output of the image processing apparatus; and
    a projection optical system which projects the light modulated by the light modulator.

6. An image processing method comprising:
    performing an image information input process which receives an input of a first image information;
    dividing a screen image based on the first image information into a plurality of areas; and
    performing a sharpness adjustment process which performs a sharpness adjustment for each of the divided areas to output a second image information, the sharpness adjustment process performing the sharpness adjustment using an adjustment value which is previously determined for each of the divided areas.

7. The image processing method according to claim 6, further comprising performing a trapezoidal correction process which makes a trapezoidal correction on the second image information.

8. The image processing method according to claim 6, further comprising performing an enlarging/reducing adjustment process which outputs third image information obtained by applying an enlarging or reducing adjustment process on the first image information, wherein the sharpness adjustment process applies the sharpness adjustment to the third image information.

9. An information storage medium in which a program controlling a computer to generate image data to be supplied to a projector is recorded, the program causing the computer to realize:
    a function of receiving input of first image information;
    a function of dividing a screen image based on the first image information into a plurality of areas;
    a function of setting an adjustment value of a sharpness adjustment for each of the divided areas; and
    a function of outputting second image information obtained by performing the sharpness adjustment for each of the divided areas based on the adjustment value.

10. An image processing method comprising:
    performing an image information input process which receives an input of a first image information;
    performing an enlarging/reducing adjustment process which outputs a third image information obtained by applying an enlarging or reducing adjustment process on the first image information;
    dividing a screen image based on the third image information into a plurality of areas; and
    performing a sharpness adjustment process which performs a sharpness adjustment to the third image information for each of the divided areas and output as a second image information.

* * * * *